(12) United States Patent  (10) Patent No.: US 6,392,701 B1
Akeyama et al.  (45) Date of Patent: May 21, 2002

(54) IMAGE SIZE REDUCING METHOD AND IMAGE SIZE REDUCING APPARATUS USING THE SAME

(75) Inventors: Tamotsu Akeyama; Yoshinori Amano, both of Takatsuki (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 08/986,268

(22) Filed: Dec. 5, 1997

(30) Foreign Application Priority Data

Dec. 6, 1996 (JP) .............................. 8-326400

(51) Int. Cl.[7] .................... H04N 5/222; H04N 5/232
(52) U.S. Cl. .................. 348/333; 348/345; 345/667
(58) Field of Search ................. 348/333, 345, 348/240, 441; 345/667–671

(56) References Cited

U.S. PATENT DOCUMENTS

| 4,500,925 A | * | 2/1985 | Hanma et al. | ............... 348/353 |
| 4,725,892 A | * | 2/1988 | Suzuki et al. | ............... 382/299 |
| 4,928,137 A | * | 5/1990 | Kinoshita | ............... 348/333 |
| 5,089,893 A |   | 2/1992 | Iwase |   |
| 5,283,651 A | * | 2/1994 | Ishizuka | ............... 348/240 |
| 5,488,432 A |   | 1/1996 | Guillon et al. |   |
| 5,502,484 A | * | 3/1996 | Okada | ............... 348/240 |
| 5,552,834 A | * | 9/1996 | Matsushima | ............... 348/441 |

FOREIGN PATENT DOCUMENTS

| EP | 403297 | 12/1990 |
| EP | 597793 | 5/1994 |
| JP | 7-170449 | 7/1995 |
| JP | 7-181937 | 7/1995 |

* cited by examiner

*Primary Examiner*—Wendy R. Garber
*Assistant Examiner*—Rashawn N. Tillery
(74) *Attorney, Agent, or Firm*—Ratner & Prestia, P.C.

(57) ABSTRACT

The image size reducing method of the invention, and the image size reducing apparatus using the same, comprising a counter for counting vertical synchronizing signals of entered image signal, a gate signal generating circuit for generating a gate signal from the count value of this counter, reduction rate of image in vertical direction, vertical synchronizing signal and horizontal synchronizing signal, and a gate circuit for decimating horizontal synchronizing signal and either one or both of enable signal and clock signal by using the gate signal, and the image display device driven by signals combined the decimated enable signal, the decimated clock signal and the decimated horizontal scanning line and displaying the reduced image in vertical size.

2 Claims, 17 Drawing Sheets

Line difference value

Image group
- Horizontal scanning line A
- Horizontal scanning line C
- Horizontal scanning line B $T_1$
$T_2$
$T_3 + a$
$T_4$
$T_5 + a + c$
$T_6$
$T_7 + b + c$
$T_8$
$T_9 + b$
.
.
.
$T_m$

FIG. 11

IMAGE SIZE REDUCING METHOD AND IMAGE SIZE REDUCING APPARATUS USING THE SAME

BACKGROUND OF THE INVENTION

The present invention relates to an image size reducing method of reducing an entered image in the vertical direction, and displaying it in an image display device, and an apparatus using the same method.

As an example of reducing an image size in the vertical direction and displaying said reduced image size in an image display device, a conventional image size reducing method is described below by referring to FIG. 14, FIG. 15, FIG. 16, and FIG. 18.

To begin with, a first prior art of image size reducing method is described.

An image display device 2 in FIG. 14 receives a vertical synchronizing signal 21, a horizontal synchronizing signal 26, an enable signal 27, and a clock signal 28, and displays image data 20 sequentially from the upper left corner to the lower right corner of an image display area. A basic decimating operation is used to recognize the beginning of a horizontal scanning line on the basis of the horizontal synchronizing signal 26, and to display the image data 20 in the image display area when the enable signal 27 provided by gate circuit 1 is active. That is, as shown in FIG. 15, a horizontal synchronizing signal 22 and one or more signals of the entered enable signal 23 and clock signal 24 are gated by the gate circuit 1, and an enable signal 27, a clock signal 28, and a horizontal synchronizing signal 26 are issued, and, as a result, each signal corresponding to image data K of K-th line is decimated by a gate signal 25.

A specific example of the gate circuit 1 is a gate circuit 3 in FIG. 16. By such decimating, image data (K+1) is displayed in the image display device 2 in the next horizontal scanning line of displaying image data (K−1) without displaying image data K.

By thus decimating the horizontal synchronizing signal 22 and enable signal 23 at the timing corresponding to an arbitrary horizontal scanning line, the image data 20 corresponding to the decimated horizontal synchronizing signal 26 and decimated enable signal 27 is displayed in the image display device 2 in a decimated state. By varying the decimating rate of the horizontal synchronizing signal 22 and enable signal 23, the number of lines in the vertical direction of the image data displayed in the image display device 2 can be freely decreased.

Thus, as far as at least the horizontal synchronizing signal 22 and one or both of the enable signal 23 and clock signal 24 are decimated, even if the image data 20 is not decimated, the image data in that portion is not displayed in the display device, and therefore, for example, certain LCD, PDP and corresponding display device can be used as the image display device to be used herein.

By making use of this method, hitherto, horizontal synchronizing signal 22 and one signal or both of the enable signal 23 and clock signal 24 are decimated in fixed horizontal scanning lines in each frame, and the entered image was reduced and displayed in the image display device 2.

In a second prior art, horizontal scanning lines to be decimated are selected arbitrarily in the horizontal scanning lines for composing the image and only the image data other than said selected horizontal scanning lines is written into the memory. The image reduced by a number of the decimated horizontal scanning lines is stored in the memory and the reduced image size can be displayed in the image display device by sequentially reading out the image data.

After writing image data of all horizontal scanning lines for composing the image into the memory, a reduced image size can be displayed in the image display device by reading out sequentially only the image data other than the horizontal scanning lines arbitrarily selected for decimating, similarly.

In the conventional method, however, the line numbers of the selected horizontal lines on the basis of the vertical synchronizing signals are fixed in all frames. That is, image size reduction was realized by decimating horizontal scanning lines always at the same positions in every frame.

In a third prior art, there is a method using a digital filter, and said image size reducing method in the vertical direction by using two-tap digital filter showing in FIG. 17 is described below. Herein, a delay circuit 4 in FIG. 17 is a delay element for delaying the entered image data by time of one horizontal scanning line.

In FIG. 18, line s, line (s+1), line (s+2), and line (s+3) are horizontal scanning lines for composing an original image before reduction, and pixels 29a, 29b, 29c, 29d are pixels belonging to individual horizontal scanning lines. The image data expressing the pixel value of each pixel is expressed by a, b, c and d individually.

The digital filter in FIG. 17 calculates pixel data a and pixel data b using formula 1, and produces pixel data e of pixel 29e of a newly created line r.

$$e = a \times p1 + b \times q1 \text{ (where p1 and q1 are integers)} \quad [1]$$

By operating this calculation on image data of all pixels of line s and line (s+1), image data of all pixels for composing line r is created newly. Herein, by replacing lines s and (s+1) by line r, the number of lines can be decreased. Similarly, from the horizontal scanning lines of line (s+2) and line (s+3), image data f of pixel 29f of horizontal scanning lines of line (r+1) can be newly created using formula 2.

$$f = c \times p2 + d \times q2 \text{ (where p2 and q2 are integers)} \quad [2]$$

Herein, the number of lines can be decreased by the same process as process in the above operation.

Similarly, by operation of formula 1, formula 2 sequentially, the vertical size of the image can be reduced.

Herein, p1, p2, . . . , q1, q2, . . . are integers determined by the reduction rate.

By determining the number of operations by the reduction rate in the vertical direction, the original image can be reduced to a desired size.

The conventional image size reducing methods are described so far, but when the original image size is reduced in the vertical direction by employing the first method and second method, since the horizontal scanning lines to be decimated are always fixed in each frame, the image data of the decimated horizontal scanning lines is completely unseen in the image display device. For example, if the horizontal synchronizing signal corresponding to the image of the horizontal line of which width is equivalent to the width of one horizontal scanning line is decimated, the horizontal line is completely eliminated. Moreover, a fine character may be considerably deformed and is very hard to be seen.

In the third method, the multiplier and line memory are needed, and the circuit is large and complicated. And, if the number of taps of digital filter is small, deterioration of frequency characteristic is significant, the edge in the vertical direction is vague, and it causes a problem of deterioration of image quality when a still image such as a personal computer image is reduced.

The invention is intended to solve such problems, and it is hence an object thereof to present an apparatus for realizing reduction of image size in the vertical direction and the image size reducing method, suppressing loss of horizontal line, deformation of fine character, distortion of image in the vertical direction, and vague edge in the vertical direction, in a simple circuit.

SUMMARY OF THE INVENTION

The image size reducing method of the invention comprises a counter for counting horizontal synchronizing signals of entered image signals, a gate signal generating circuit for generating a gate signal using the count value of the counter, the reduction rate in the vertical direction of the image, the vertical synchronizing signal and horizontal synchronizing signal, and a gate circuit for decimating horizontal synchronizing signal H at least one of enable signal E and clock signal C by using the gate signal, and an entered signal is displayed in an image display device by using the vertical synchronizing signal and decimated horizontal synchronizing signal H' and one of a combination of decimated enable signal E' and clock signal C, a combination of the enable signal E and decimated clock signal C', or a combination of decimated enable signal E' and decimated clock signal C'.

There are two kind of means in the image size reducing apparatus of the invention roughly. First means comprises a counter for counting vertical synchronizing signals, a gate signal generating circuit for generating a gate signal using the count value of the counter, the reduction rate in the vertical direction of the image size, the vertical synchronizing signal and horizontal synchronizing signal, a gate circuit for decimating horizontal synchronizing signal H and at least one of enable signal E and clock signal C, by using the gate signal, and an image display device driven by the vertical synchronizing signal and decimated horizontal synchronizing signal H' and one of a combination of decimated enable signal E' and clock signal C, a combination of the enable signal E and decimated clock signal C', or a combination of decimated enable signal E' and decimated clock signal C'.

The image size reducing apparatus using this structure described above is further classified into two apparatuses. One is to reduce the image size by decimating the signals relating to predetermined line numbers.

The other one has a structure added a delay circuit for delaying the image data, a subtraction circuit for calculating the difference value of the two pixel values, and an adder for adding the difference value to the above constitution and reduces the image size is reduced by decimating the signals relating to the selected horizontal scanning lines, using the line difference value determined from the difference value of the pixels of two adjacent horizontal scanning lines.

The former is described in embodiment 1, and the latter, in embodiment 3.

Second means of the image size reducing apparatus of the invention comprises a counter for counting vertical synchronizing signals of image signals, a memory for storing image data of image signals, a memory control unit for controlling to store the image data selectively into the memory or to read out the image data selectively from the memory, and an image display unit for displaying the read image data.

The image size reducing apparatus using this structure is further classified into two types. One is to reduce the image size by controlling to write image data of the predetermined line number into the memory or to read out the image data from the memory.

The other one has a structure added a delay circuit for delaying the image data, a subtraction circuit for calculating the difference value of the image data between the line before delay and image data after delay, and an adder for adding the difference value to the above structure and reduces the image size by controlling to store the image data selected using the line difference value obtained from the difference value between the pixel data of two adjacent horizontal scanning lines into the memory or to read out the image data from the memory.

The former is described in embodiment 2, and the latter, in embodiment 4.

BRIEF DESCRIPTION OF THE DRAWINGS

FIG. 11 is an explanatory diagram of action of modified example 2 of embodiment 3 of the invention.

DETAILED DESCRIPTION OF THE INVENTION

Figure 1:
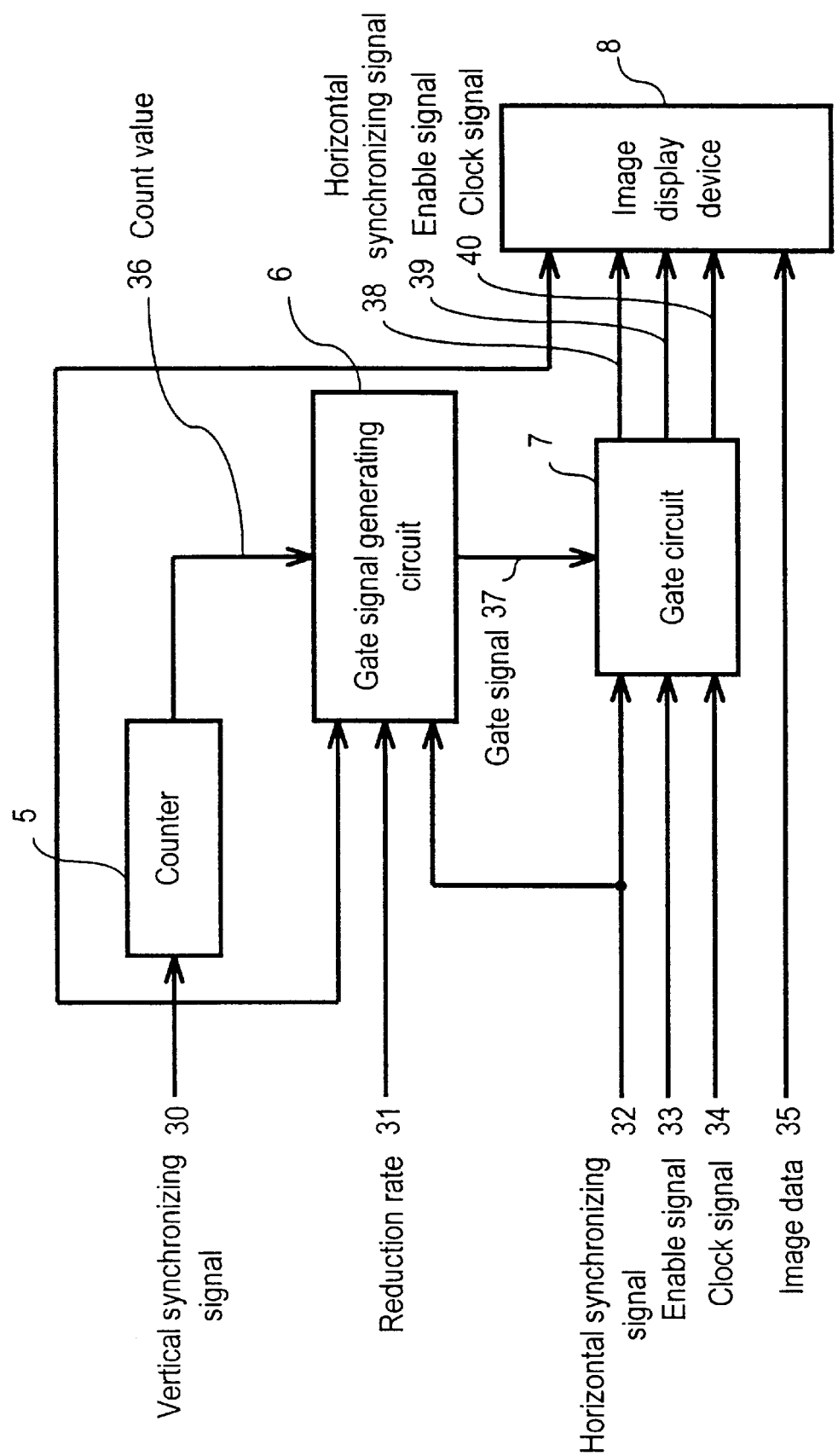
FIG. 1 is a block diagram of an image size reducing apparatus in a first embodiment of the invention.

Referring now to the drawings, the image size reducing apparatus used in the embodiments of the invention, and the image size reducing method used therein are described.

Embodiment 1

FIG. 1 is a block diagram of an image size reducing apparatus in embodiment 1 of the invention. In FIG. 1, reference numeral 5 is a counter, 6 is a gate signal generating circuit, 7 is a gate circuit, and 8 is an image display device. The operation of the image size reducing apparatus is described below while referring to FIG. 2 and FIG. 3. Incidentally, in FIG. 1, FIG. 2, and FIG. 3, horizontal synchronizing signals 38, 32, 38A, 38B, and 38C which are control signals of the image display device 8 are of negative polarity, whereas enables signals 39, 33, 39A, 39B, and 39C, and clock signals 40, 34, 40A, 40B, and 40C are of positive polarity. Clock signal 34 is a system clock, clock 40 is a clock signal provided by gate circuit 7. The letters A, B and C are used in reference to clock signal 40, enable signal 39 and gate signal 37 to designate timing relationships between the signals at specific horizontal scanning instances.

That is, on the basis of the leading edge of clock signal 40, the image display device 8 in FIG. 1 recognizes the beginning of the horizontal scanning line at the rise or fall of the period "L" of horizontal synchronizing signal 38, and displays image data 35 by synchronizing with the leading edge of the clock signal in the period "H" of enable signal 39.

Supposing the number of horizontal scanning line of the image data 35 entered in the image display device 8 in FIG. 1 to be y, and the reduction rate 31 of the image entered in the gate signal generating circuit 6 to be y'/y (y' being an integer), the gate signal generating circuit 6, selects noncontinuous (y–y') horizontal scanning lines, out of y horizontal scanning lines for composing one field of the image data 35 as the first decimating action, and said selected lines are called a processing line group.

Figure 2:
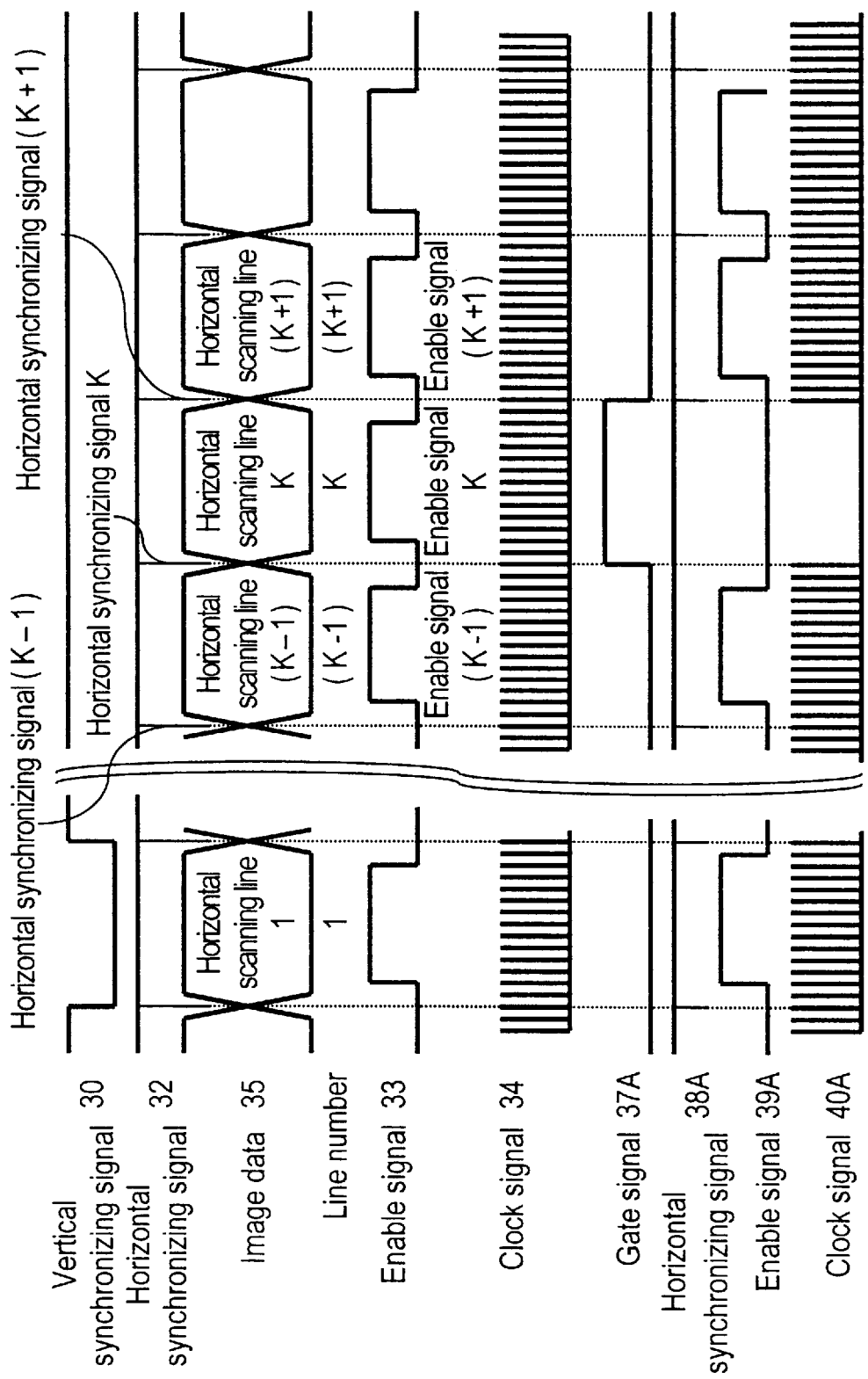
FIG. 2 is a signal waveform diagram for explaining a first decimating action of the image size reducing apparatus in the structure in FIG. 1.

Supposing one horizontal scanning line in the selected processing line group to be horizontal scanning line K in FIG. 2, the gate signal generating circuit 6 generates a gate signal 37A for decimating one or both of an enable signal K corresponding to the period of the horizontal scanning line K and the clock signal group K in said period, and the horizontal synchronizing signal K (in FIG. 2, it is supposed to decimate all of enable signal K, clock signal K, and horizontal synchronizing signal K).

Figure 4:
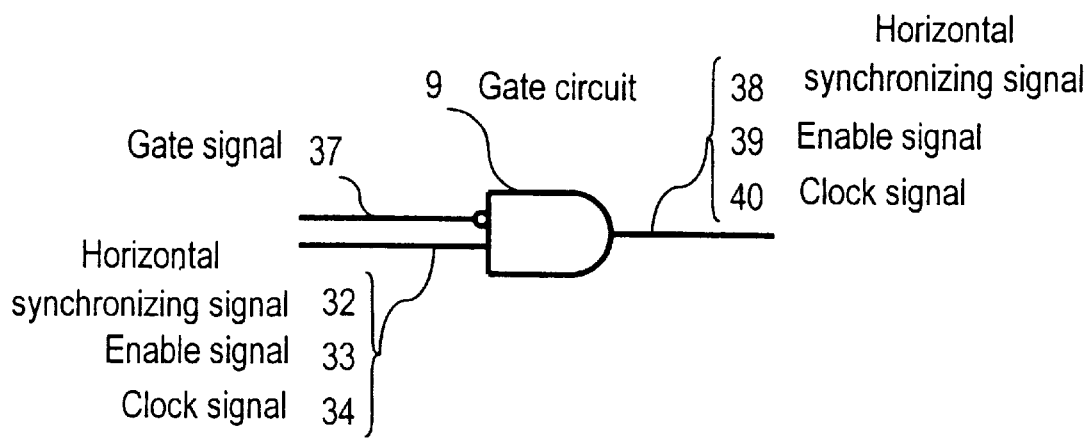
FIG. 4 is an explanatory diagram of a gate circuit in FIG. 1.
Figure 5:
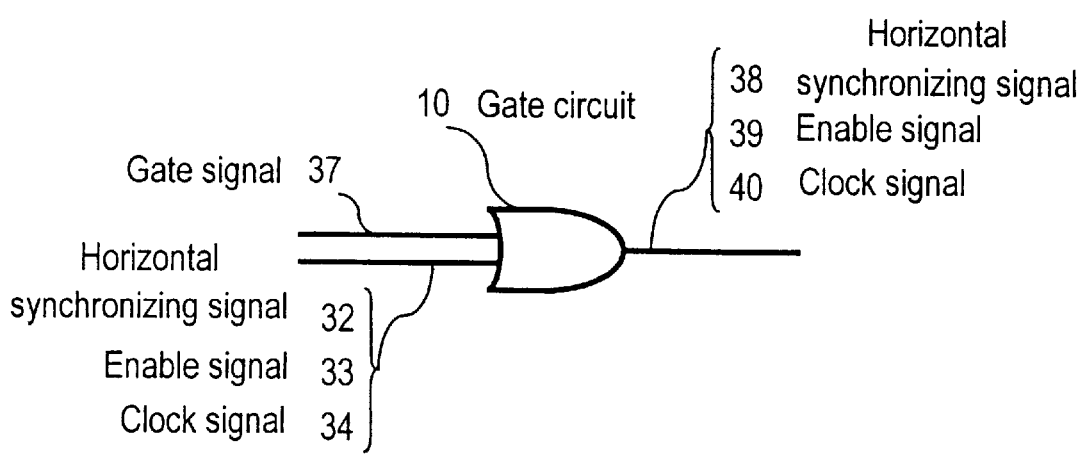
FIG. 5 is an explanatory diagram of the gate circuit in FIG. 1.

And, the gate circuit 7, decimates the horizontal synchronizing signal 32, enable signal 33, and clock signal 34 using the gate signal 37A, and generates horizontal synchronizing signal 38A, enable signal 39A, and clock signal 40A. In this case, the gate circuit 9 in FIG. 4 is used when the horizontal synchronizing signal 32, enable signal 33, and clock signal 35 are of positive polarity as the gate circuit 7, and the gate circuit 10 in FIG. 5 is used when they are of negative polarity.

At this time, one or both of enable signal 33 and clock signal 34 corresponding to the horizontal scanning line to be decimated and the horizontal synchronizing signal are decimated by the gate circuit 7 similarly in the processing line group other than the horizontal scanning line K.

The image display device 8 displays the image using horizontal synchronizing signal 38A, enable signal 39A, clock signal 40A, vertical synchronizing signal 30 and entered image data 35 which are generated according to the procedure written above. At this time, the image data 35 of the horizontal scanning line selected as the processing line group is not displayed in the image display device 8 because the corresponding control signal is decimated in the gate circuit 7, and, as a result, the image of y' horizontal scanning lines reduced at reduction rate of y'/y in the vertical direction is displayed in the image display device 8.

Figure 3:
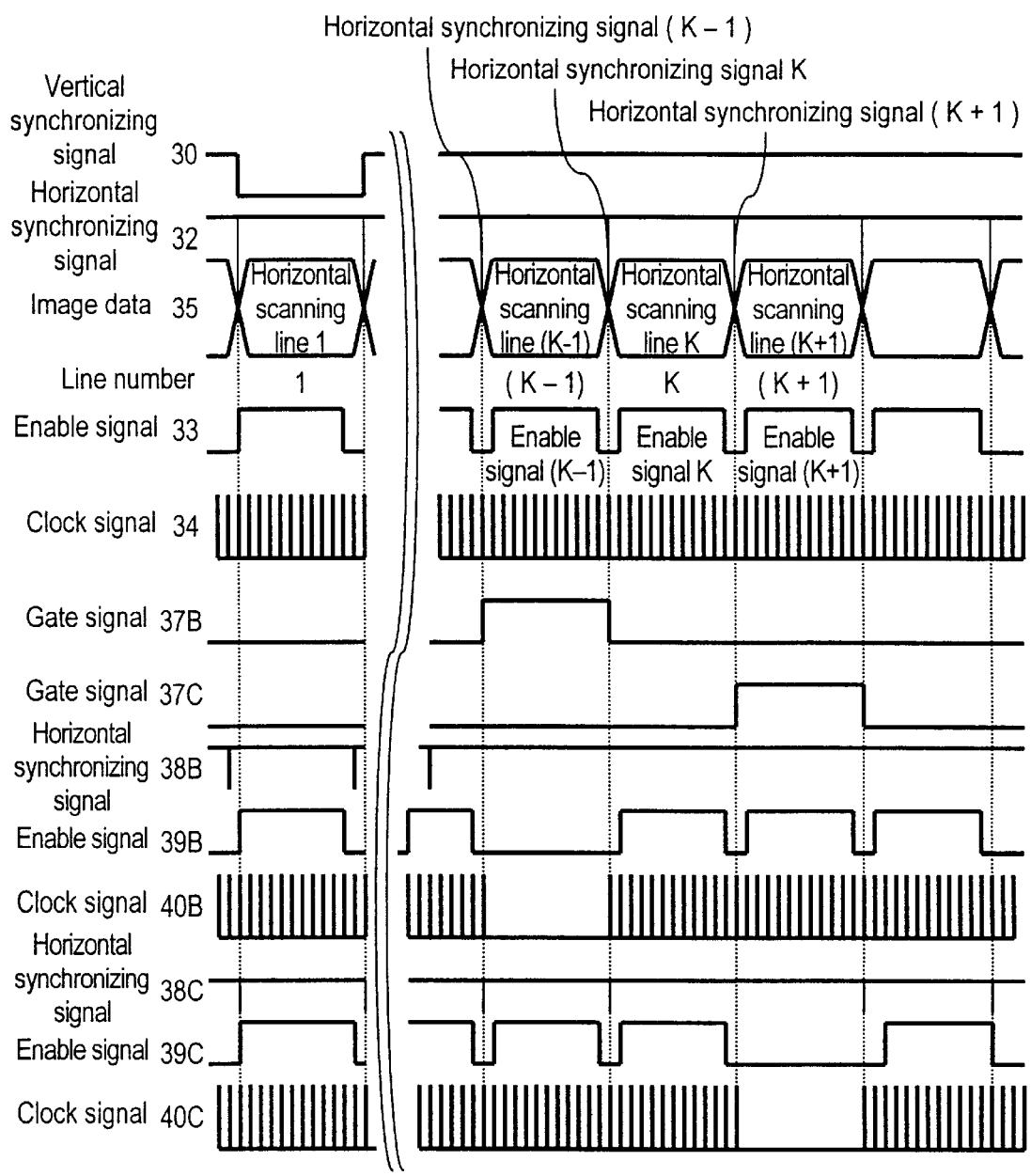
FIG. 3 is a signal waveform diagram for explaining a second decimating action of the image size reducing apparatus in the structure in FIG. 1.

A second decimating action is described below referring to FIG. 1 and FIG. 3.

By using a count value 36 of the counter 5 for counting the vertical synchronizing signals 30, if the count value 36 of the counter 5 in first decimating action is an even number, the following process is done in the second decimating action when the count value is odd number. In each horizontal scanning line (horizontal scanning line K in FIG. 2) of the processing line group selected in the first decimating action, the gate signal, 37C or gate signal 37B and either one of the enable signal 33 and clock signal 34 corresponding to the horizontal scanning line (K+1) of the line number adding one to the line number K on the basis of the vertical synchronizing signal 30, or the horizontal line number (K–1) subtracting one are generated in order to decimate the horizontal synchronizing signal 32.

Similarly, if the count value is odd number in first decimating action, the following processing is done in second decimating action when the count value is even number. The gate signal 37C or gate signal 37B to decimate the horizontal synchronizing signal 32 and either one of the enable signal 33 and clock signal 34 in the period of the horizontal scanning line (K+1) adding one to the line number K on the basis of the vertical synchronizing signal 30, or the horizontal line number (K–1) subtracting one, are generated in each horizontal scanning line (horizontal scanning line K in FIG. 2) of the processing line group selected in the first decimating action.

The gate circuit 7 generates the horizontal synchronizing signal 38B, enable signal 39B, clock signal 40B, or horizontal synchronizing signal 38C, enable signal 39C, and clock signal 40C, using said gate signal 37B or gate signal 37C, same as in the first decimating action. The image display device 8 displays the image by using vertical synchronizing signal 30 and entered image data 35 and either one of combination of horizontal synchronizing signal 38B, enable signal 39B and clock signal 40B, or horizontal synchronizing signal 38C, enable signal 39C and clock signal 40C. At this time, same as in the first decimating action, the image data 35 of the horizontal scanning line corresponding to the decimated control signal is not displayed in the image display device 8, but the image of y' horizontal scanning lines reduced at the reduction rate of y'/y in the vertical direction is displayed in the image display device 8.

The first decimating action and second decimating action are repeated alternately in the frame unit. By such operation, the horizontal scanning lines not displayed in the image display device 8 by the decimating process of the control signal are shifted by one line in each frame, so that complete loss of image of a specific horizontal scanning line can be avoided, and loss of the horizontal line or deformation of fine character in the reduced image size can be suppressed.

Although the clock signal 34 is decimated in embodiment 1, but there is a display device having a similar effect without decimating the clock signal 34 depending on the type of the image display device 8. In such a case, decimating process of the clock signal 34 may be omitted.

And then, depending on the type of the image display device 8, the enable signal 39 may not be required, and in such a case, therefore, the decimating process in embodiment 1 may be done only in the horizontal synchronizing signal 32 and clock signal 34.

Embodiment 2

Figure 6:
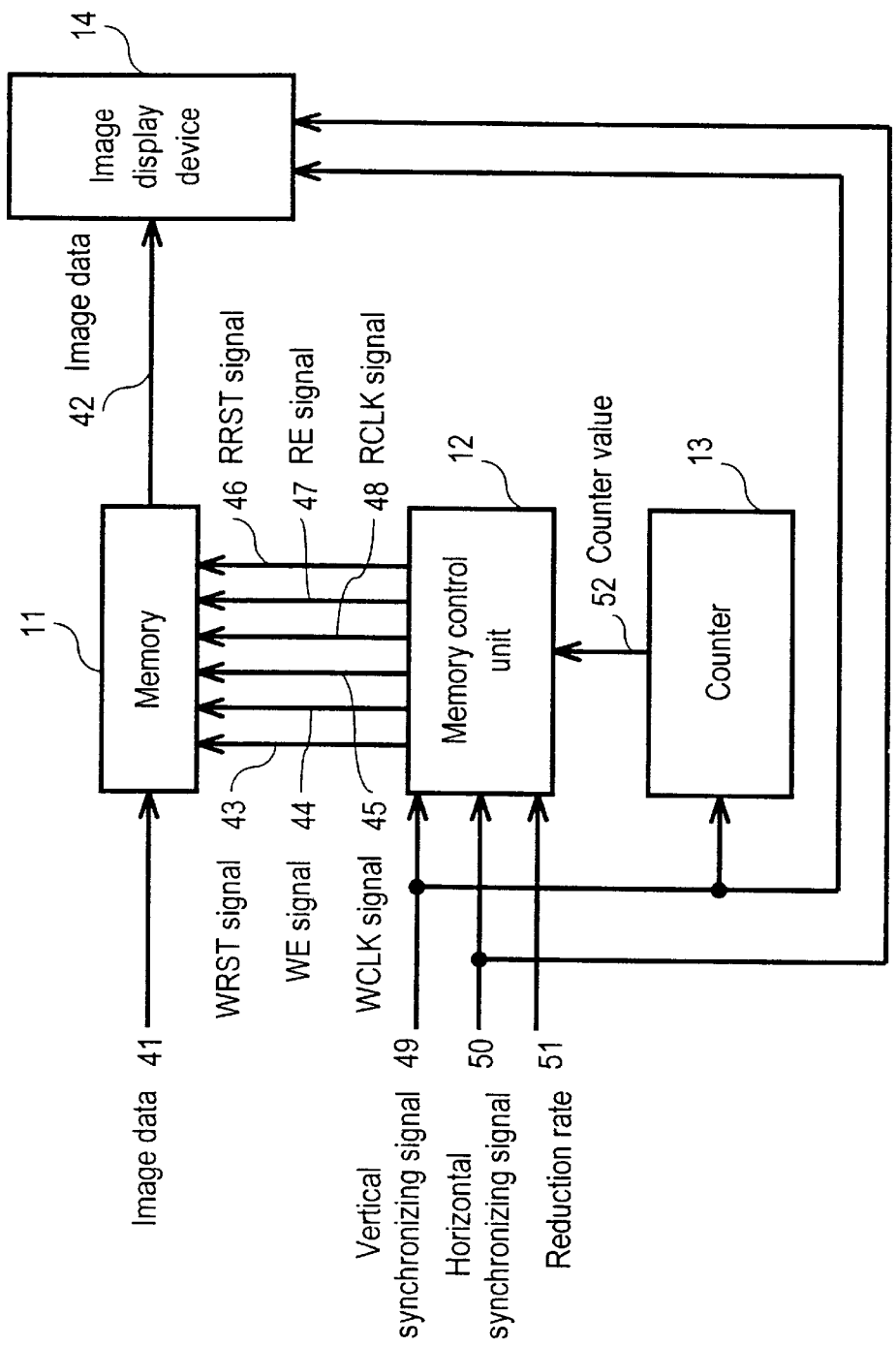
FIG. 6 is a block diagram of an image size reducing apparatus in a second embodiment of the invention.

FIG. 6 is a block diagram of an image size reducing apparatus in embodiment 2 of the invention. In FIG. 6, reference numeral 11 is a memory unit, 12 is a memory control unit, 13 is a counter, and 14 is an image display device.

Figure 7:
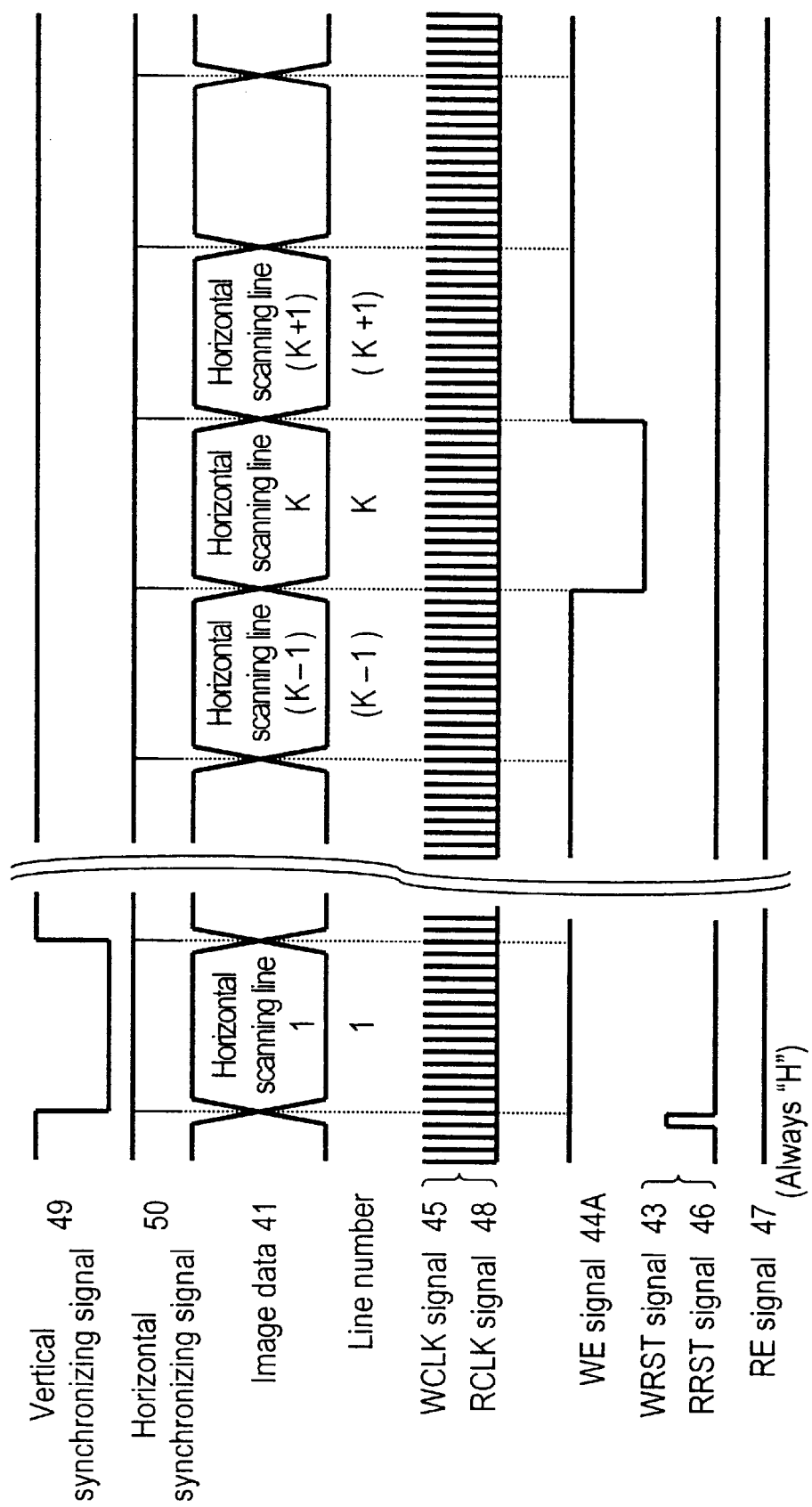
FIG. 7 is a signal waveform diagram for explaining a first decimating action of the image size reducing apparatus in embodiment 2 and embodiment 4 of the invention.
Figure 8:
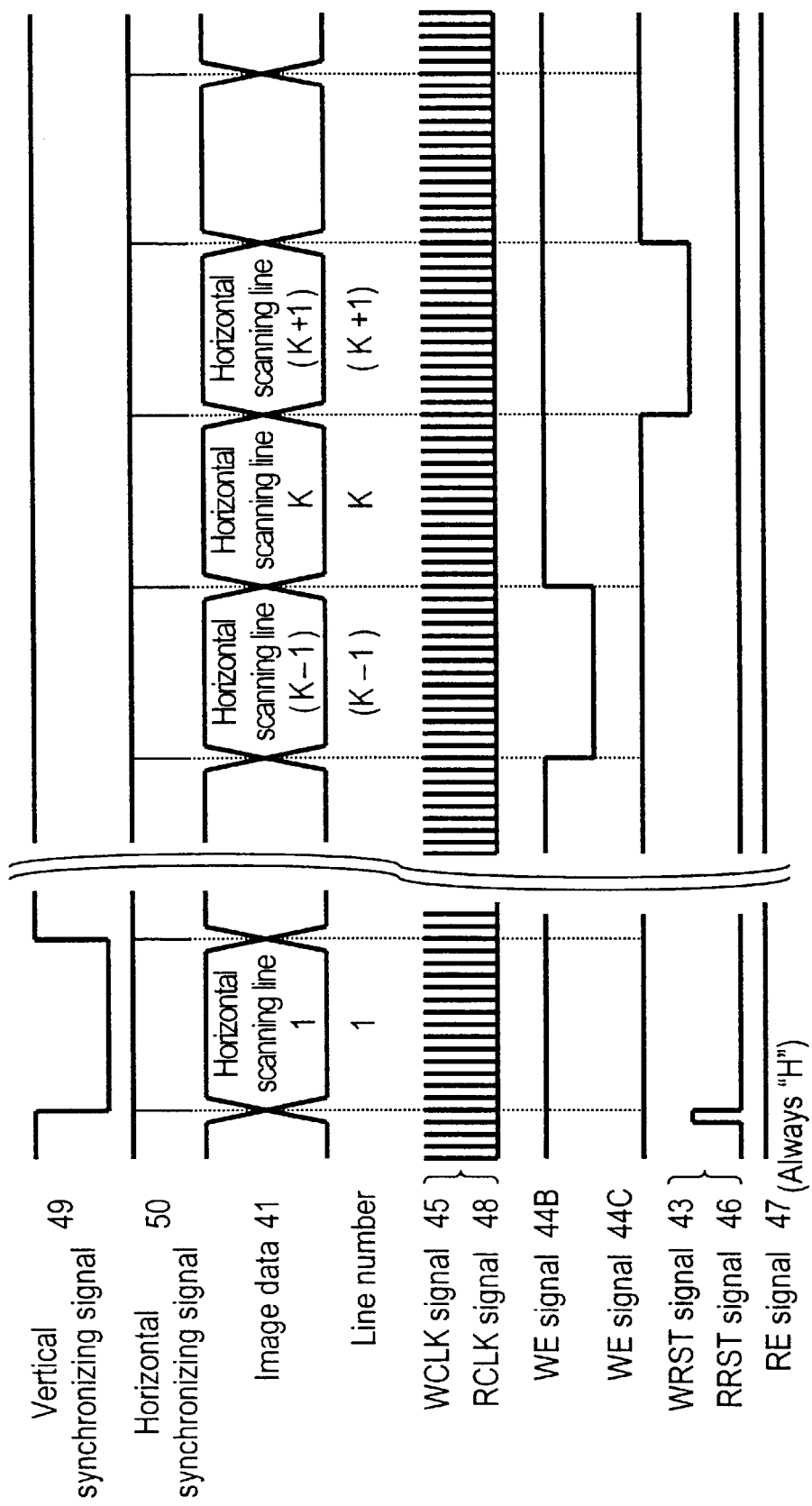
FIG. 8 is a signal waveform diagram for explaining a second decimating action of the image size reducing apparatus in embodiment 2 and embodiment 4 of the invention.

Referring now to FIG. 7 and FIG. 8, the operation of the image size reducing apparatus in FIG. 6 is described below. This operation is shown in the flowchart in FIG. 13*a* and FIG. 13*b*. Herein, referring to a case of using an FIFO (first in first out) memory as memory unit 11, it is supposed that the WRST signal 43 which is a write reset signal for controlling the FIFO, a WE signal 44 which is a write enable signal, an RRST signal 46 which is a read reset signal, and an RE signal 47 which is a read enable signal are of positive polarity.

And then, a WCLK signal 45 which is a write clock signal, and an RCLK signal 48 which is a read clock signal are clock signals for driving the FIFO.

Figure 13A:
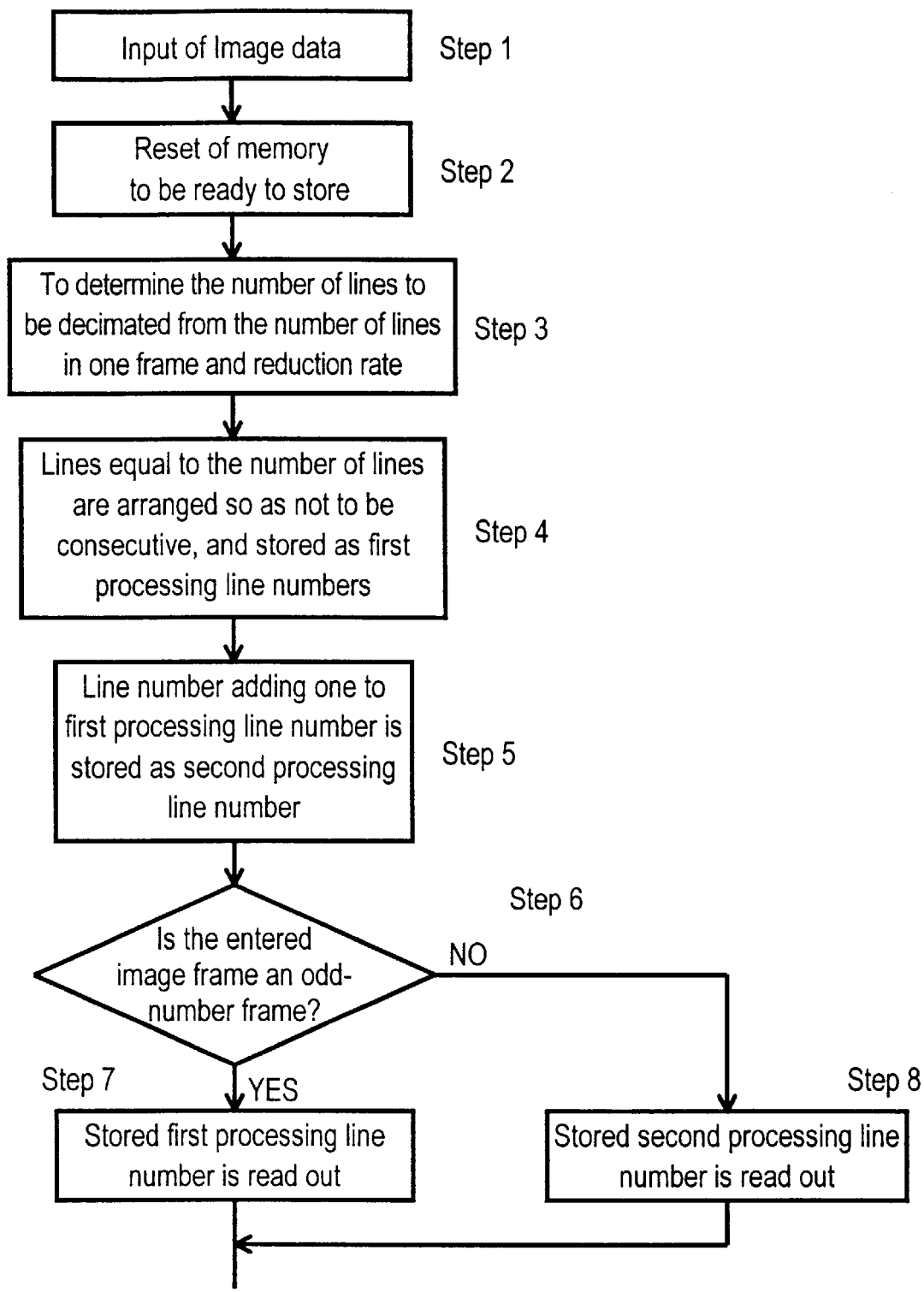
FIG. 13a is a first half of flowchart of image size reducing method used in embodiment 2.
Figure 13B:
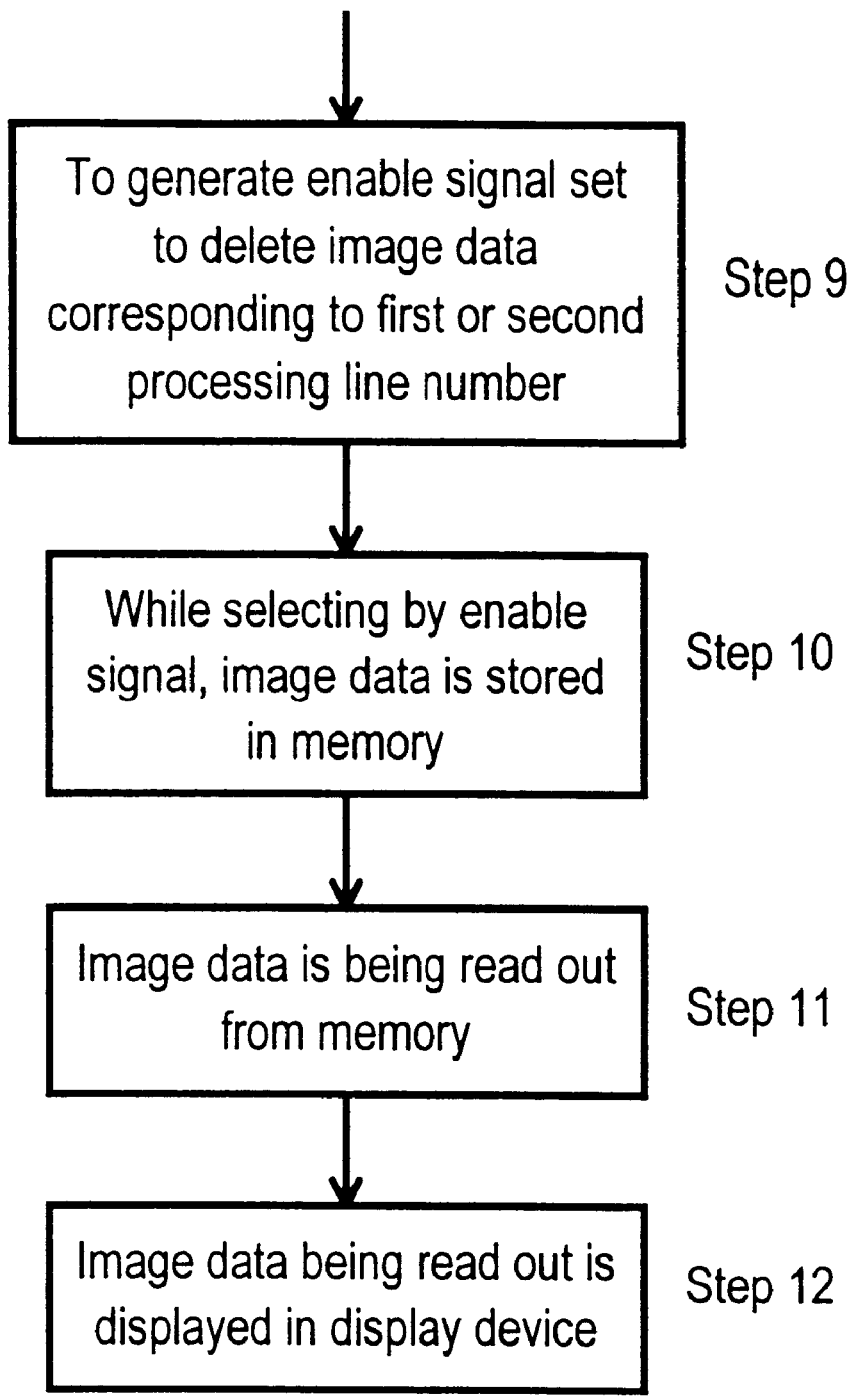
FIG. 13b is a second half, following FIG. 13a, of flowchart of image size reducing method used in embodiment 2.
Figure 14:
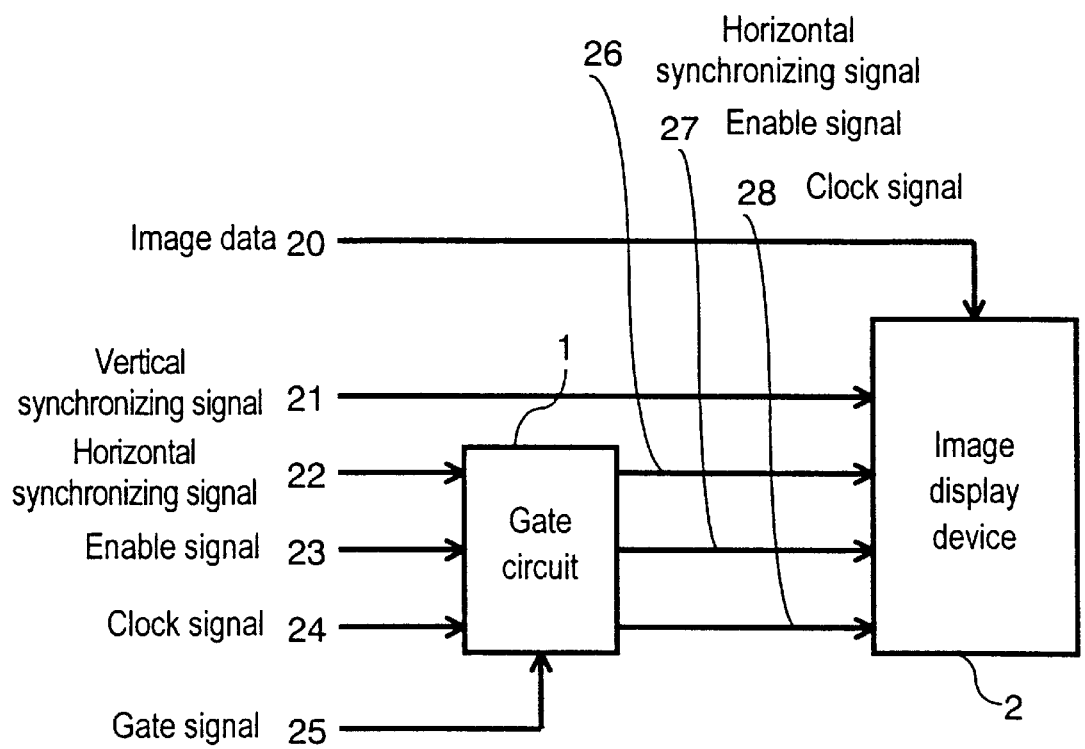
FIG. 14 is a block diagram of a conventional image size reducing apparatus.
Figure 15:
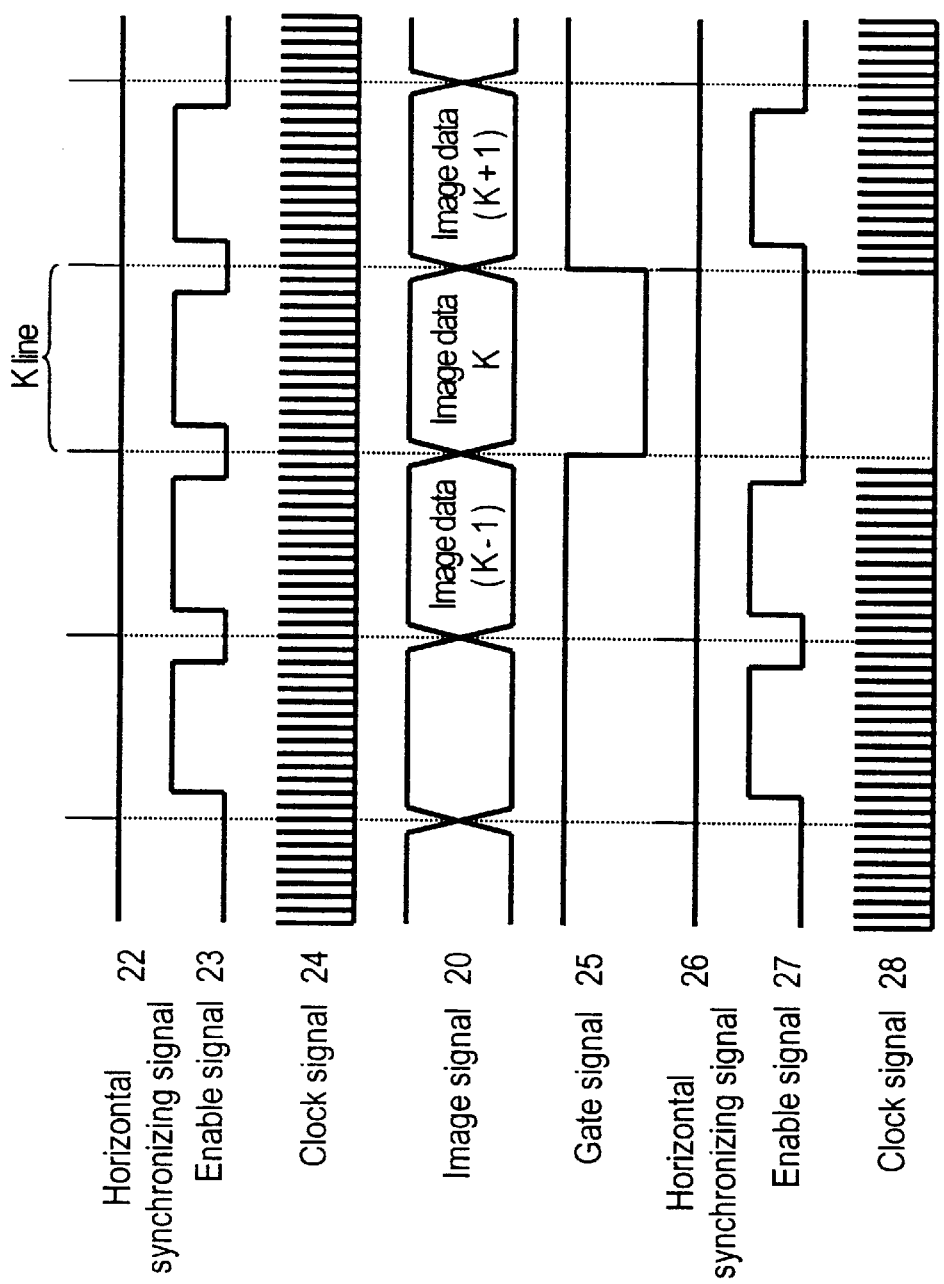
FIG. 15 is a signal wave form diagram for explaining the action of the conventional image size reducing apparatus in the structure in FIG. 14.
Figure 16:
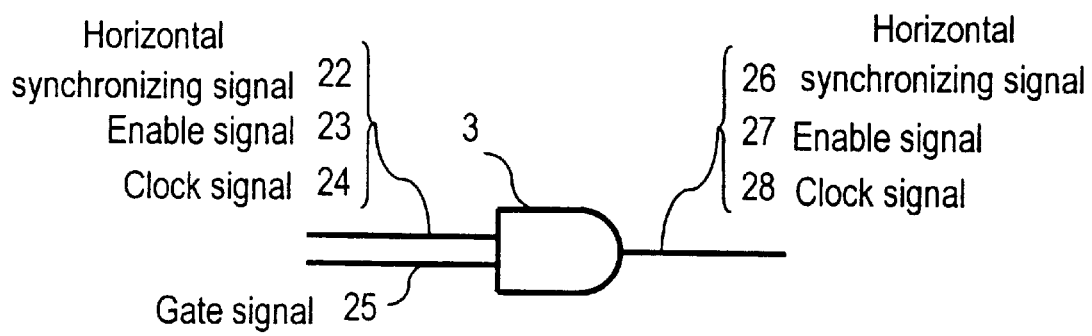
FIG. 16 is an explanatory diagram of a gate circuit in FIG. 14.
Figure 17:
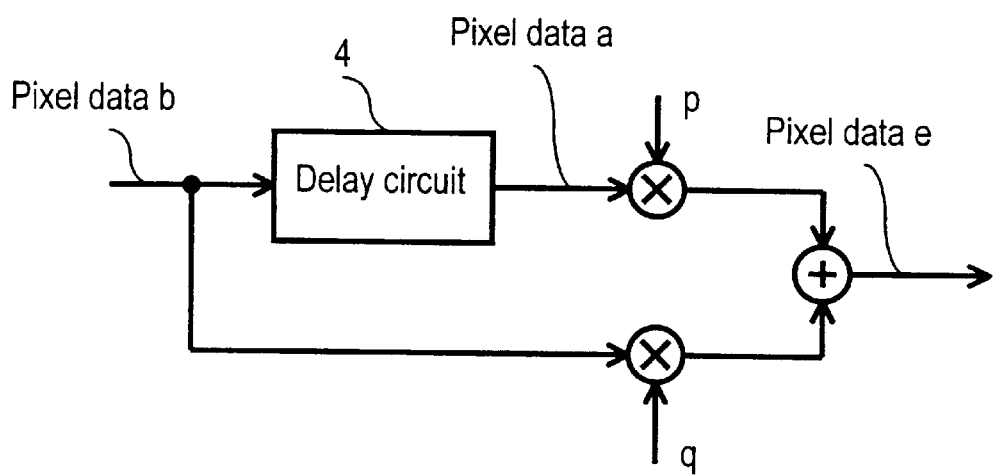
FIG. 17 is a block diagram of a digital filter used in one of the conventional image size reducing apparatuses.
Figure 18:
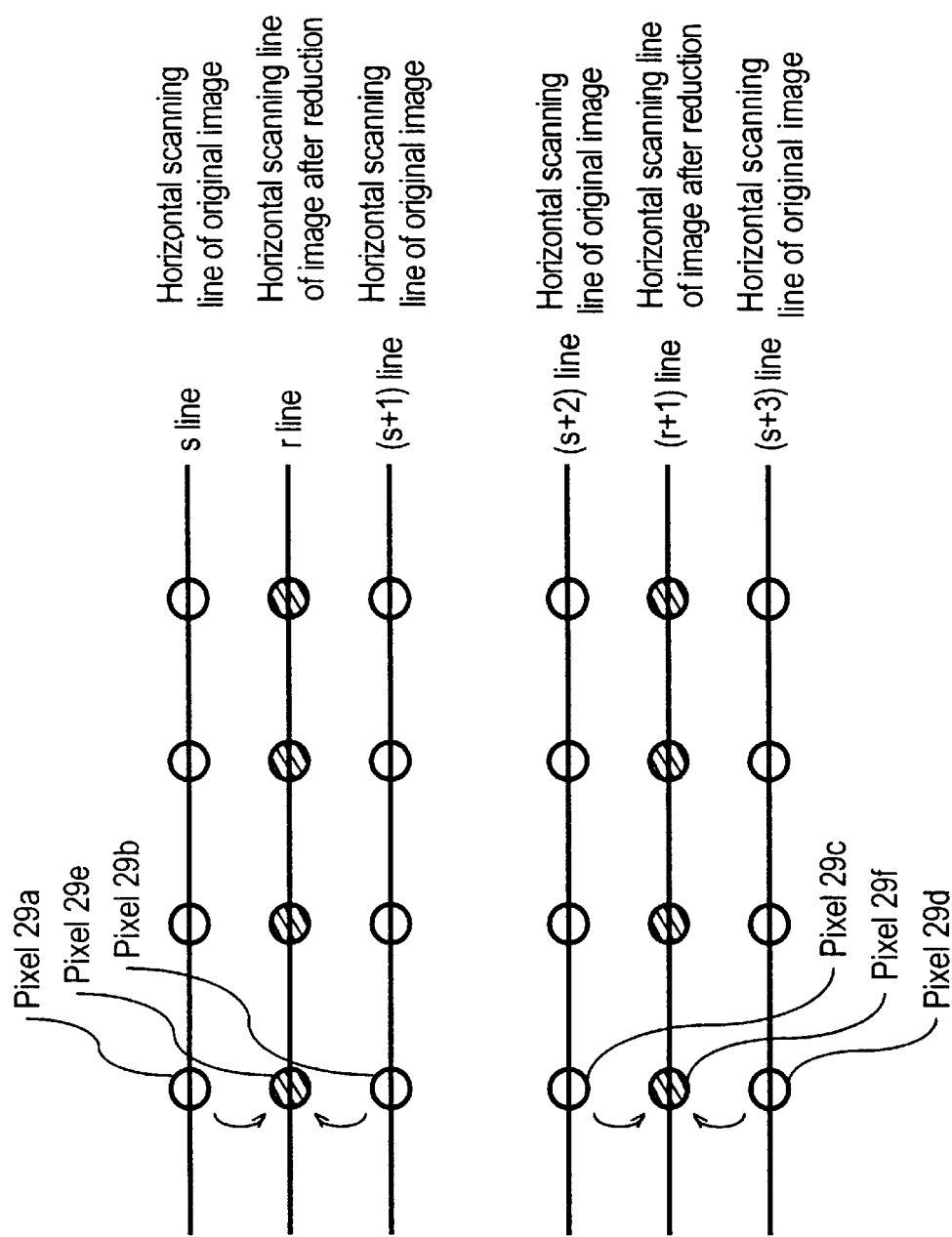
FIG. 18 is an explanatory diagram of line decimation using the digital filter in FIG. 17.

The operation flow of embodiment 2 is described while referring to FIG. 6, FIG. 13*a* and FIG. 13*b*. Each step of the operation is enclosed in parentheses in the following description of operation.

First, the memory control unit 12 resets the memory unit 11 by WRST signal, and enables to write the image data 41. (Step 2)

Next, using the given image size reduction rate 51 and the number of horizontal scanning lines of the image before reduction, the number of processing lines to be decimated is calculated. (Step 3)

A non-continuous line number of the number of processing lines is predetermined, and stored as a first processing line number. (Step 4)

Using the WE signal 44A generated according to the procedure mentioned later, the image data excepting the image data corresponding to said first processing line number in the image data of the first frame is written into the memory 11. (Steps 7, 9, 10)

Using the RE signal 47, the image data of the first frame is read out from the memory 11. (Step 11)

The above decimating action is the first decimating action.

The image display unit displays the image data 42 being read out. (Step 12).

Further, the memory control unit 12 determines the processing line number having one added to or subtracted from the line number as second decimating action, and stores it as the second processing line number, (Step 5)

generates WE signal 44B or WE signal 44C being set so as to remove the image data corresponding to the processing line number out of the image data of the second frame, (Steps 8, 9)

writes the image data of the second frame into the memory 11 while decimating, by using the WE signal 44B or WE signal 44C, and (Step 10)

reads out the image data of the second frame from the memory 11 by using the RE signal 47. (Step 11)

The above decimating action is the second decimating action.

The image display unit displays the image data being read out. (Step 12)

The counter 13 counts the vertical synchronizing signal 49, and outputs the signal for changing over the first decimating action and second decimating action alternately in frame unit to the memory control unit 12. (Step 6)

Thereafter, the first decimating action and second decimating action are executed alternately in the frame unit, and the image size is reduced.

The above operation is further specifically described below by referring to FIG. 6 and FIG. 7.

To begin with, non-continuous (y–y') horizontal scanning lines out of y horizontal scanning lines for composing one field of the image data 41 are selected in an arbitrary frame image, as the first decimating action, same as in embodiment 1, and said selected line are a processing line group. One horizontal scanning line of the processing line group to be decimated is supposed to be the horizontal scanning line K in FIG. 7.

The memory control unit 12, in action of writing image data 41 into the memory 11, generates a WE signal 44A which is set to forbid the image data of the selected processing line group of the image data 41 to write into the memory 11. That is, the image data 41 of horizontal scanning line K in FIG. 7 is not written into the memory 11.

The memory control unit 12 also, in writing action of image data 42 from the memory unit 11, generates an RE signal 47 which is set to read out sequentially the image data 42 stored in the memory 11, and further generates WRST signal 43 and RRST signal 46 which are set to be "H" at the beginning position of the image data 41.

As a result, the image data 42 in a state of decimating the image data corresponding to the processing line group of the image data 41 is issued from the memory 11, and the image display device 14 displays the image data 42 reduced at reduction rate y'/y in the vertical direction by using the image data 42, vertical synchronizing signal 49 and horizontal synchronizing signal 50.

The second decimating action is described below referring to FIG. 6 and FIG. 8. The memory control unit 12 generates WE signal 44B or WE signal 44C so that the image data of horizontal scanning lines (K+1) having one added to the line numbers of the processing line group selected in the first decimating action, or horizontal scanning lines (K−1) of line numbers having one subtracted may be not written into the memory 11 when the count value 52 is odd number in the second decimating action if the count value 52 of the counter 13 in the first decimating action is an even number, or when the count value 52 is even number in the second decimating action if the count value is odd number in the first decimating action using the count value 52 of the counter 13 for counting the vertical synchronizing signals 49. The line numbers are counted on the basis of the vertical synchronizing signal 49.

That is, in the second decimating action, the image data of the horizontal scanning line either before or after the horizontal scanning line of the processing line group selected in the first decimating action is forbidden to be written into the memory 11.

WRST signal 43, RE signal 47, and RRST signal 46 are same setting as in the first decimating action, and the image display device 14 displays the image data 42 reduced at reduction rate y'/y in the vertical direction, by using the image data 42, vertical synchronizing signal 49, and horizontal synchronizing signal 50, same as in the first decimating action.

By repeating the first decimating action and second decimating action alternately in the frame unit, the horizontal scanning line of the image data not displayed in the image display device 14 by decimating process is shifted by one line in each frame, and complete dropout of image of a certain horizontal scanning line can be avoided, and loss of horizontal line or deformation of fine character in the reduced image size can be suppressed.

In embodiment 1, since the horizontal synchronizing signal is decimated in order to reduce the vertical size of the image, the number of horizontal synchronizing signals per frame differs with the reduction rate of the image size in the vertical direction. However in the circuit configuration in embodiment 2, the horizontal synchronizing signal which is a control signal of the image display device is not decimated, and the number of horizontal scanning lines in one frame is kept constant. Accordingly, even in the image display device that is required to be constant in the frequency of the horizontal synchronizing signal, for example, in the image display device using a cathode-ray tube, a reduced image size can be displayed.

Meanwhile, when a random access memory such as DRAM and VRAM is used in the memory 11, the memory control unit 12 generates a control signal of the memory 11 in order that the image data 41 may not be written into the memory 11 when the WE signal 44A in FIG. 7 is "L", and further, in the second decimating action, the memory control unit 12, generates a control signal of the memory 11 in order that the image data 41 may not be written into the memory 11 when the WE signal 44B or WE signal 44C in FIG. 8 is "L".

By performing the first decimating action and second decimating action alternately in the frame unit, the same effect as when using the FIFO is obtained even in the image size reducing apparatus using random access memory as memory 11.

Besides, since random access to the address in the memory is possible, as the first decimating action, the memory control unit 12 prohibits reading of image data corresponding to the processing line group, out of the image data 41 stored in the memory 11, after writing all image data 41 into the memory 11, and controls the memory 11 so as to read out sequentially the image data 42 other than the processing line group, and further, as the second decimating action, the memory control unit 12 prohibits reading of image data of the horizontal scanning line either before or after each horizontal scanning line of the processing line group selected in the first decimating action, out of the image data 41 stored in the memory 11, and controls the memory 11 so as to read out sequentially the image data 42, and by performing such first decimating action and second decimating action alternately frame by frame, the same effect as the FIFO is obtained, in the image size reducing apparatus using a random access memory, and the image size reduced at reduction rate y'/y in the vertical direction can be displayed in the image display device 14.

Embodiment 3

Figure 9:
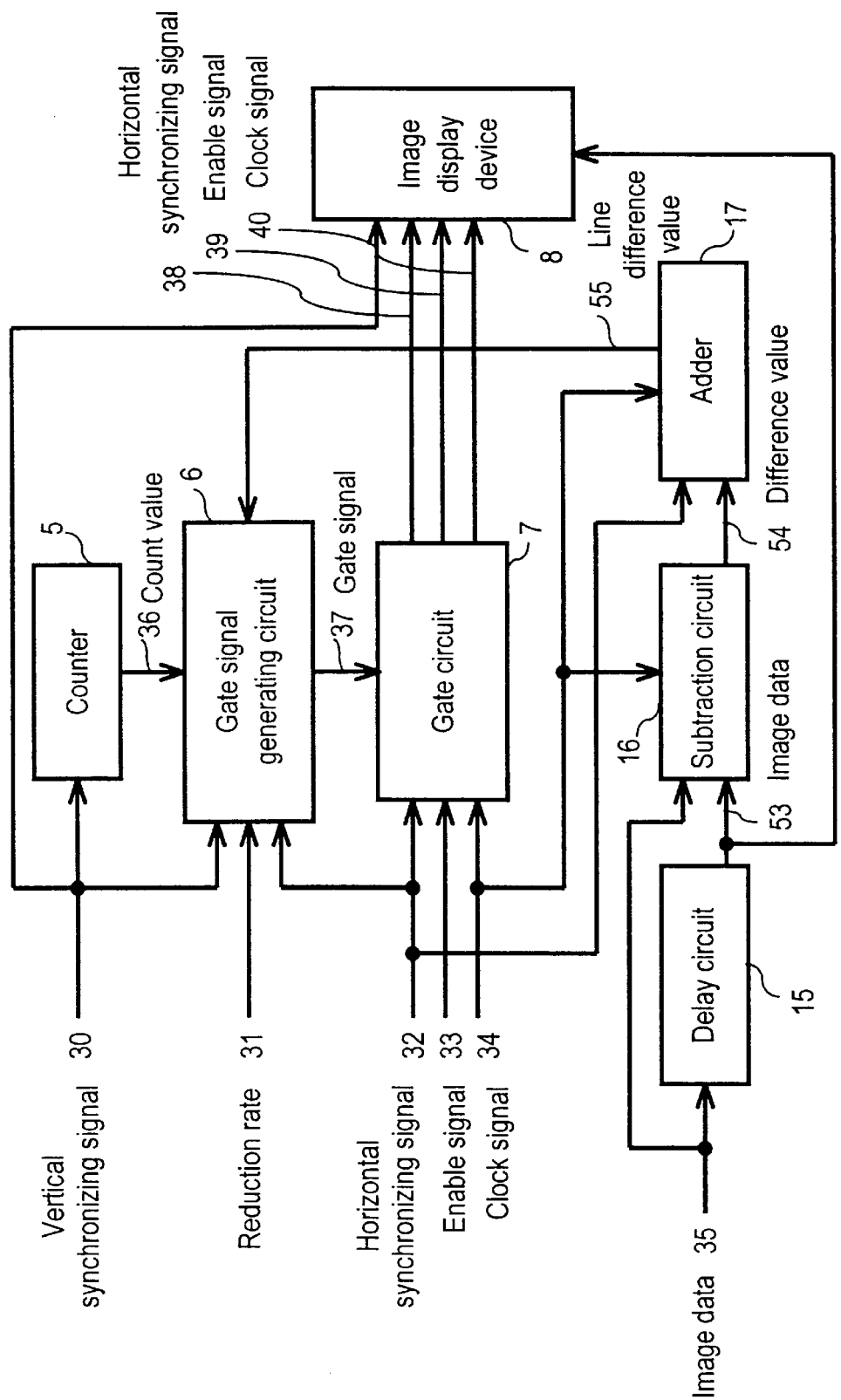
FIG. 9 is a block diagram of an image size reducing apparatus in embodiment 3 of the invention.

FIG. 9 is a block diagram of an image size reducing apparatus in embodiment 3 of the invention. The structure in FIG. 9 is similar to the structure in FIG. 1, further comprising a delay circuit 15, a subtraction circuit 16, and an adder 17. Embodiment 3 involves three types of image size reducing apparatus. The common operation of three types of image size reducing apparatus is described referring to FIG. 2, FIG. 3 and FIG. 9 first.

To reduce the image composed of x dots of pixels in a horizontal scanning line and y lines of horizontal scanning lines at reduction rate of y'/y (y' being an integer) in the vertical direction, the delay circuit 15 delays image data 35 by the time corresponding to one line, and the subtraction circuit 16 calculates a difference value 54 which subtracts pixel data of the image data 35 before delay from each pixel data of the image data 53 delayed by the time corresponding to one line, in the pixel unit, on the basis of the clock signal 34. This difference value 54 is the difference value of the image data 53 delayed.

By contrast, the difference value 54 of subtracting the image data delayed by the time corresponding to one line from the image data before delay may be also used as the difference value of the image data 35 before delay.

The adder 17 calculates a line difference value 55 by summing up $P(1 \leq P \leq x)$ difference values per horizontal scanning line selected previously, out of the difference value 54 issued from the subtraction circuit 16, in the unit of one line on the basis of the horizontal synchronizing signal 32 and clock signal 34. The line difference value 55 of a certain horizontal scanning line expresses the difference value corresponding to next horizontal scanning line, and is calculated in all horizontal scanning lines for composing one frame out of the image data 35 in the adder 17.

Said operation of the delay circuit 15, subtraction circuit 16, and adder 17 is performed in one frame interval, and its timing is described in following explanation of the operation of the gate signal generating circuit.

Since the gate signal generating circuit 6 operates differently in each frame, its operation is described, frame by frame. The initial frame for image size reduction is called a first frame, and subsequent frames are called second frame, third frame and so forth.

In the first frame, to begin with, a gate signal for decimating image data of all lines is generated, and display of image of the first frame in the display device is prohibited.

During generating said gate signal, the delay circuit 15, subtraction circuit 16, and adder 17 calculate the line difference value of all horizontal scanning lines for composing the first frame, which is stored in the gate signal generating circuit 6.

In the second frame, the configuration of the lines to be decimated in one frame is determined, that is, whether the region for selecting the line numbers is the entire frame as one region, or the region divided one frame into Z groups, and in the case of Z groups, the number of lines to be decimated in one frame determined by the reduction rate is assigned to each group, and the decimating process line group of each region is selected by using the line difference value of the first frame and the number of processing lines assigned in each region, and the gate signal is generated by using each line number of the processing line group same as in embodiment 1.

This above operation is the first decimating action.

That is, supposing one horizontal scanning line in the processing line group selected in the first decimating action to be horizontal scanning line K in FIG. 2, a gate signal 37A is generated for decimating enable signal K corresponding to horizontal scanning line K, one or both of clock signal group K, and horizontal synchronizing signal K.

In the third frame, in each horizontal scanning line of the processing line group selected in the first decimating action, a gate signal 37C is generated for decimating horizontal synchronizing signal (K+1) enable signal (K+1), and clock signal group (K+1) corresponding to horizontal scanning line (K+1) having one added to the line number K on the basis of the vertical synchronizing signal 30.

This above operation is the second decimating action.

Instead of the horizontal scanning line (K+1), incidentally, a gate signal 37B corresponding to the horizontal scanning line (K−1) having one subtracted from the reference line number K may be generated. In this case, however, the difference value must be the value by subtracting the pixel value of the line before one line frame the pixel value of the objective line.

Furthermore, during to the second decimating action, the delay circuit 15, subtraction circuit 15, and adder 17 calculate the line difference value of the third frame for use in selection of the decimating process line of the fourth frame.

After the third frame, the operation of the second frame and third frame is repeated alternately.

As above description, same as in embodiment 1, the gate signal 37A and gate signal 37C are alternately generated in frame unit in the gate signal generating circuit 6, and, for example, in an even-number frame, the gate circuit 7 decimates the horizontal synchronizing signal 32, enable signal 33, and clock signal 34 by using the gate signal 37A, and creates the horizontal synchronizing signal 38A, enable signal 39A, and clock signal 40A, and similarly in an odd-number frame, using gate signal 37C, the horizontal synchronizing signal 38C, enable signal 39C and clock signal 40C are generated.

In a unit of one frame, the image display device 8 displays, image data 53 decimating in the unit of one line and displays the image reduced at reduction rate y'/y in the vertical direction, by using the vertical synchronizing signal 30 and a control signal alternately changing over the combination of horizontal synchronizing signal 38A, enable signal 39A, and clock signal 40A and combination of horizontal synchronizing signal 38C, enable signal 39C, and clock signal 40C.

In FIG. 2, for the convenience of explanation, there is only one horizontal scanning line where the gate signal 37A is "H", but actually there are (y–y') positions.

A modified example 1 of the image size reducing apparatus in embodiment 3 is explained below based on the common operation in embodiment 3, briefing only different points from the common operation referring to FIG. 2 and FIG. 3.

The structure is exactly same as in FIG. 9, and different points are only determination of the region in the gate signal generating circuit 6, and the method of selection of line to be processed in the first decimating action.

First, the region for selecting the line to be decimated is a frame. Therefore, without dividing the frame into plural image groups, the horizontal scanning lines in the number of processing lines determined by the reduction rate are decimated from the entire frame.

Then, the processing lines in the first decimating action are horizontal scanning lines equivalent to line numbers from the smaller value of the line difference value operated in the preceding frame till the number of processing lines.

That is, selecting processing line numbers corresponding to (y–y') line difference values from the smaller one of the line difference value 55 determined in the preceding frame, a gate signal is generated for horizontal scanning lines corresponding to the processing line numbers out of the horizontal scanning lines for composing the present frame.

Figure 10:
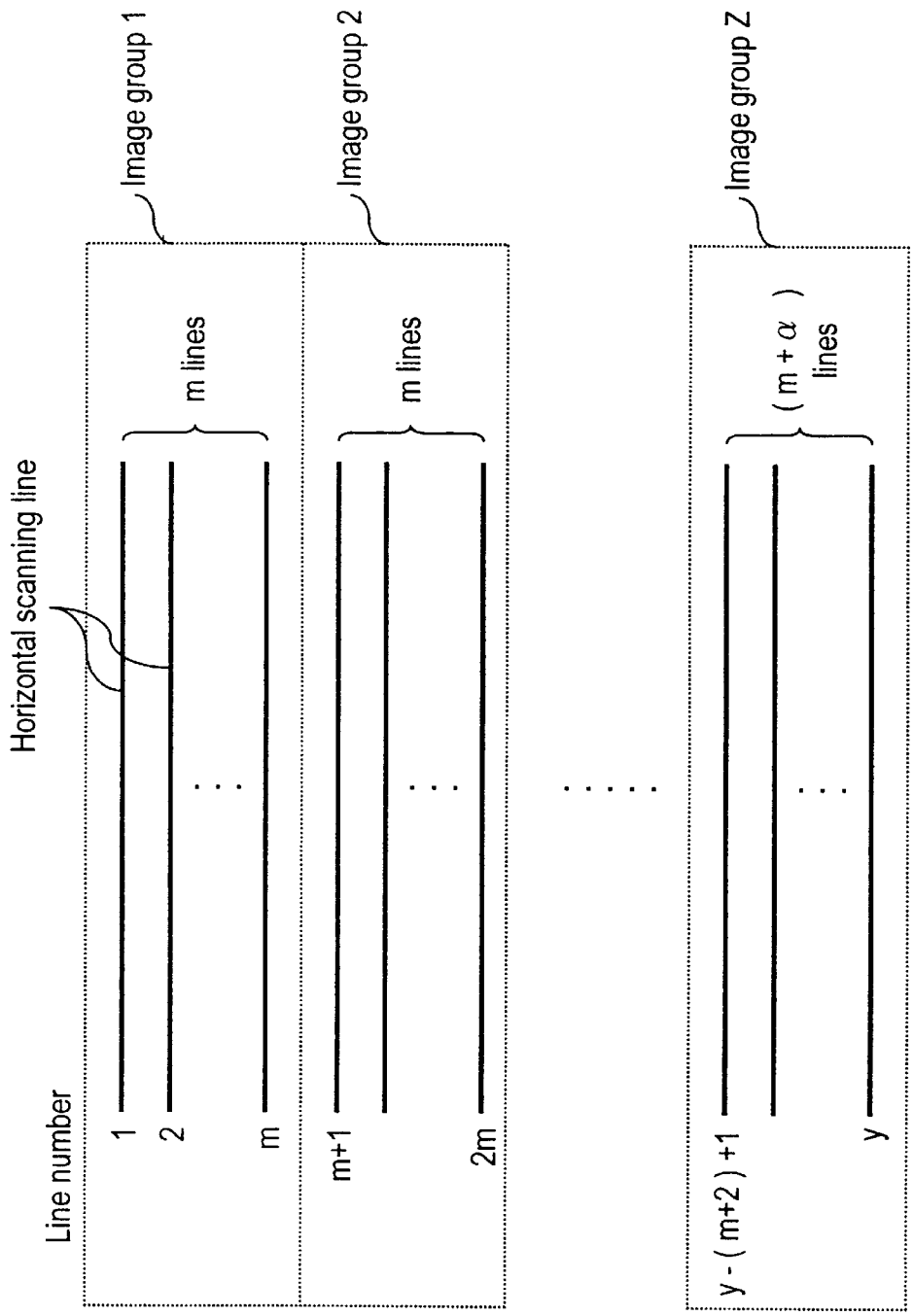
FIG. 10 is an explanatory diagram of action of modified example 2 of embodiment 3 of the invention.

Next, a modified example 2 of the image size reducing apparatus in embodiment 3 is explained below based on the common operation in embodiment 3, briefing only different points from the common operation referring to FIG. 10.

The structure is exactly same as in FIG. 9, and different points are only determination of the region in the gate signal generating circuit 6, and the method of selection of line to be processed in the first decimating action.

First, the region for selecting the horizontal scanning lines to be decimated is obtained by dividing one frame into Z groups of image, and the horizontal scanning lines in the number of processing lines determined by the reduction rate 31 are distributed into Z group of image, and the processing line number is selected in each group, and is decimated.

This operation is described in detail below. In the case of reduction of image composed of x dots of pixels in a horizontal scanning line and y lines of horizontal scanning lines at reduction rate $\{(m-n) \times z + \alpha\}/(m \times z + \alpha)(|\alpha| < z,$ and m, n, z, $\alpha$ are integers) in the vertical direction, as shown in FIG. 10, the image is divided into (z–1) group of image in the unit of m lines sequentially from the first line, and the image of the remaining (m+) lines is the z-th groups of image.

In each image group, the gate signal generating circuit 6, selects n horizontal scanning lines from the smaller one of the line difference value 55, among the horizontal scanning lines for composing an image group, using the line difference value 55 calculated in the procedure of modified example 1 of embodiment 3.

This operation is executed on all image groups, and n×z horizontal scanning lines are selected in total. The selected lines compose the processing line group mentioned in modified example 1 of embodiment 3, and thereafter it conforms to the procedure of modified example 1 of embodiment 3. That is, the horizontal synchronizing signal 32 and either one or both of enable signal 33 and clock signal 34 in the period corresponding to the processing line group and next horizontal scanning lines of the processing line group, are decimated. As a result, the image size reduced at reduction rate y'/y in the vertical direction is displayed in the image display device 8.

Still more, a modified example 3 of the image size reducing apparatus in embodiment 3 is explained below based on the common operation in embodiment 3, briefing only different points from the common operation while referring to FIG. 11.

The structure is exactly same as in FIG. 9, and different points are only determination of the region in the gate signal generating circuit 6, and the method of selection of line to be processed in the first decimating action.

First, the region for selecting the lines to be decimated is obtained by dividing one frame into Z groups of image, and the horizontal scanning lines in the number of processing lines determined by the reduction rate 31 are distributed into Z groups of image and, the processing line number is selected in each group, and is decimated. The grouping procedure is same as the procedure of modified example 2 of embodiment 3.

FIG. 11 shows one of the image groups divided according to the procedure of modified example 2 of embodiment 3. Herein, T1 to Tm denote line difference values 55 of horizontal scanning lines calculated in the procedure of modified example 1 of embodiment 3.

The gate signal generating circuit 6 selects the horizontal scanning line of the smallest line difference value among the line difference values T1 to Tm in the image group, for example, horizontal scanning line A, as the horizontal scanning line to be decimated.

Next, the gate signal generating circuit 6 adds an arbitrary value a to line difference values T3 and T5 of the horizontal scanning lines before and after the horizontal scanning line A, and selects the horizontal scanning line with the smallest line difference value, among all horizontal scanning lines except horizontal scanning line A in the image group, for example, horizontal scanning line B, as the horizontal scanning line to be decimated.

Furthermore, the gate signal generating circuit 6 adds an arbitrary value b to the line difference values T7 and T9 of the horizontal scanning lines before and after the horizontal scanning line B, and selects the horizontal scanning line with in the smallest line difference value, among the horizontal scanning lines except the horizontal scanning lines A and B in the image group, for example, horizontal scanning line C, as the horizontal scanning line to be decimated.

When selecting the horizontal scanning line to be decimated is selected next, a specific constant is added to the line difference values T5 and T7 before and after the horizontal scanning line C, and the horizontal scanning line to be decimated is selected according to the same procedure. In this case, T5 and T7, have been already added by constants a and b, respectively as shown in FIG. 11, in order to decimate horizontal scanning lines A and B. The specified constant to be added at this time must be set larger than a and b. Therefor, in FIG. 11, they are respectively set at (T5+a+c) and (T7+b+c).

By continuing this procedure further, n horizontal scanning lines can be selected in one image group.

Herein, the specified constants, that is, a, b, c, and so forth are numerical values to be added in order to lower the probability of decimating consecutive horizontal scanning lines in a specific image group.

This operation is done in each image group, and (n×z) horizontal scanning lines are selected in total as the horizontal scanning lines to be decimated, which compose the processing line group mentioned in modified example 1 of embodiment 3.

In embodiment 3, the clock signal 34 is also decimated same as in embodiment 1, but, depending on the image display device 8, the same effect may be obtained without decimating the clock signal 34. In such a case, the decimating process of clock signal 34 may be omitted.

Further, depending on the image display device 8, the enable signal 39 may not be necessary, and in such a case, the decimating process of embodiment 3 may be executed only on the horizontal synchronizing signal 32 and clock signal 34, except the enable signal 33.

Thus, in modified example 1 of embodiment 3 of the invention, as selecting the processing line group by using the difference value between the horizontal scanning line and the next horizontal scanning line in the region where change of image in the vertical direction is rather small, by priority, a reduced image size which has less flickering of horizontal line and vague edge in the vertical direction and small deformation of fine character, can be displayed, compared with the case of selecting the processing line group arbitrarily.

However, in the case of modified example 1, depending on the image, consecutive horizontal scanning lines may be selected as the processing line group, and in such a case the entire image may be largely distorted in the vertical direction.

In such a case, according to modified example 2, the processing line group is selected in each image group, and horizontal scanning lines are decimated more uniformly, so that distortion of the entire image in the vertical direction may be suppressed.

According to modified example 3, moreover, possibility of selecting consecutive horizontal scanning lines as the processing line group is much lower, and distortion of entire image in the vertical direction may be further suppressed.

Embodiment 4

Figure 12:
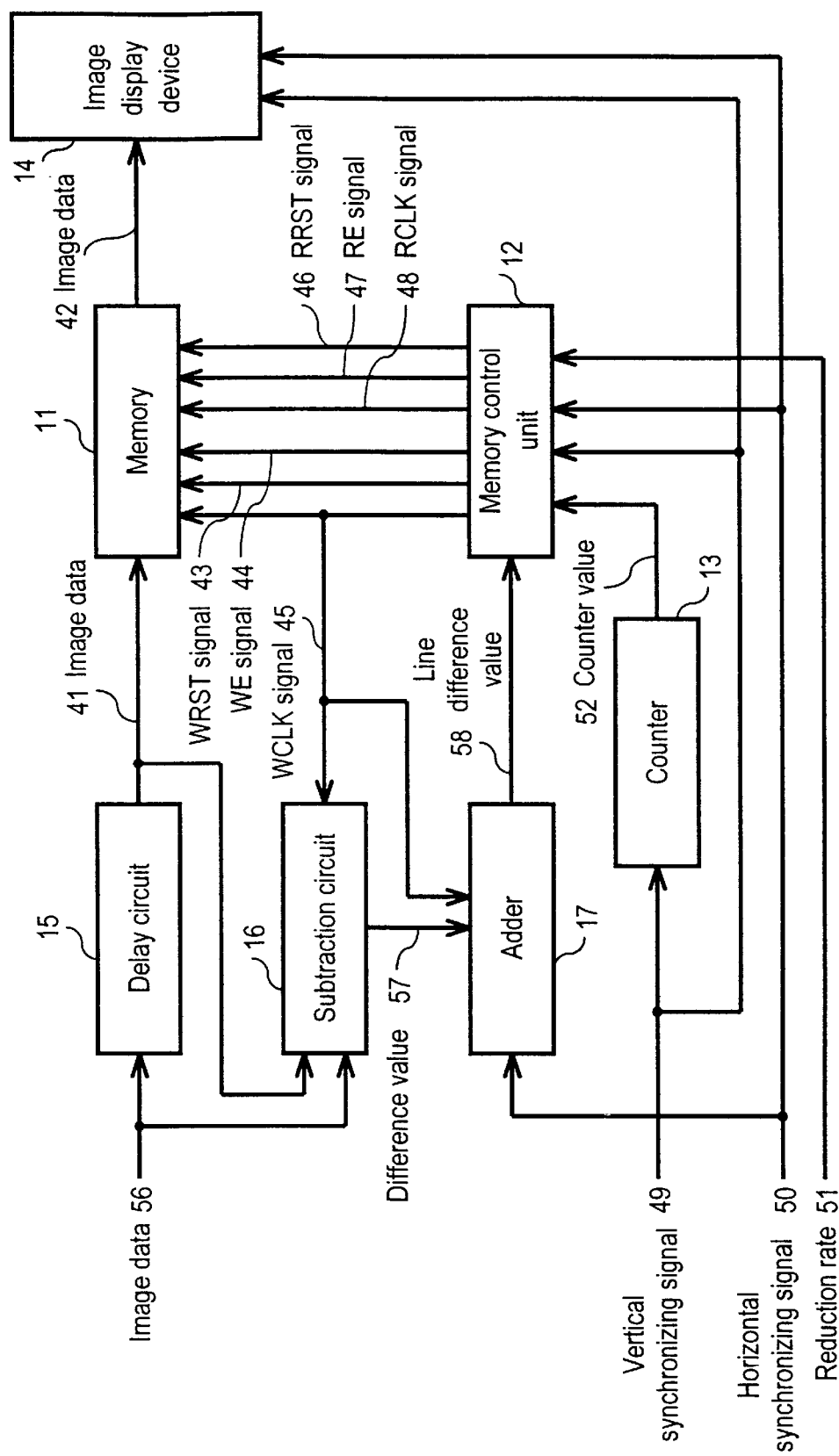
FIG. 12 is a block diagram of an image size reducing apparatus in embodiment 4 of the invention.

FIG. 12 is a block diagram of an image size reducing apparatus in embodiment 4 of the invention. The structure in FIG. 12 is same us the structure in FIG. 6, adding to delay circuit 15, a subtraction circuit 16, and an adder 17.

Herein, a First In First Out (FIFO) memory is used as the memory 11, and WRST signal 43 which is a write reset signal for controlling FIFO, WE signal 44 which is a write enable signal, RRST signal 46 which is a read reset signal, and RE signal 47 which is a read enable signal are all supposed to be of positive polarity.

Besides, WCLK signal 45 which is a write clock signal, and RCLK signal 48 which is a read clock signal are clock signals for driving the FIFO.

In the image size reducing apparatus in embodiment 4, there are three type of modified examples. First, the basic operation common to the three type of modified examples is explained below while referring to FIG. 7, FIG. 8, and FIG. 12.

In the case of reduction of image data 56 composed of x dots of pixels in a horizontal scanning line and y lines of horizontal scanning lines at reduction rate y'/y (y' being an integer) in the vertical direction, the delay circuit 15 delays the image data 56 by the time corresponding to one line, the subtraction circuit 16 calculates the difference value 57 by subtracting the pixel data of the image data 56 before delay from the pixel data of the image data 41 delayed by the time corresponding to one line in the pixel unit, on the basis of the WCLK signal 45. This difference value 57 is the difference value of the image data 41 delayed by the time corresponding to one line.

To the contrary, the difference value 57 by subtracting the pixel data delayed by the time corresponding to one line from the pixel data before delay may be also used as the difference value of the image data 56 before delay.

The adder 17 calculates the line difference value 58 by summing up P (1P x) difference values per one horizontal scanning line previously selected from the difference value 57 issued from the subtraction circuit 16 on the basis of the horizontal synchronizing signal 50 and WCLK signal 45.

This line difference value 58 denotes the difference value of the pixel data of a certain horizontal scanning line to the pixel data of next horizontal scanning line, and is calculated on all horizontal scanning lines composing the frame out of the image data 56 in the adder 17.

Since the memory control unit 12 operates differently in each frame, the operation is described below frame by frame. The initial frame of the image for image size reduction is called a first frame, and thereafter the frames are called second frame, third frame and so forth sequentially.

In the first frame, generating a WE signal being set to decimate image data of all lines is generated, writing of image data into the memory 11 is forbidden using said WE signal, and image is not displayed.

In the second frame, the region for selecting the lines to be decimated in one frame is determined, that is, it is determined whether the entire frame is set as the region for selecting the line number, or the frame is divided into Z groups, and when dividing into Z groups, the number of lines to be decimated per frame determined by the reduction rate is assigned in each group, and the decimating process line group of each region is selected by using the line difference value of the first frame and the number of processing lines assigned in each region in the entire frame or in each image group, the WE signal 44A in FIG. 7 for this processing line group, is generated in the procedure described in embodiment 2 and writing of the image data 41 corresponding to the processing line group into the memory 11 is forbidden.

WRST signal, RRST signal, and RE are generated in the memory control unit 12 same as in embodiment 2, and the image display device 14 displays the image data 42 reduced at the reduction rate y'/y in the vertical direction, by using the vertical synchronizing signal 49 and horizontal synchronizing signal 50.

The above operation is the first decimating action.

In the third frame, WE signal 44C in FIG. 8 is generated for prohibiting writing into the memory of the image data 41 corresponding to the horizontal scanning line having one added to the line number of each horizontal scanning line of the processing line group selected in the first decimating action.

The above operation is the second decimating action.

Furthermore, during the second decimating action, the delay circuit 15, subtraction circuit 15, and adder 17 calculate the line difference value of the third frame, and said line difference values are used for selection of the decimating process line of the fourth frame.

The second decimating action is described in detail below while referring to FIG. 8.

The memory control unit 12 generates WE signal 44C being set to prohibit writing into the memory 11 of the image data of horizontal scanning line of which the line number is added one to the line number of each horizontal scanning line of the processing line group selected in the first decimating action, when the count value 52 of the counter 13 is odd in the second decimating action if the count value 52 of the counter 13 in the first decimating action is even, or when the count value 52 of the counter 13 is even in the second decimating action if the count value 52 of the counter 13 is an odd number in the first decimating action. Instead of adding one to the line number, the WE signal 44B corresponding to the horizontal scanning line of the line number having one subtracted may be generated. In this case, however, the difference value must be the value of subtracting the pixel value of the line before one line from the pixel value of the objective line.

That is, in the second decimating action, it is intended to forbid writing into the memory 16 of the image data corresponding to the next horizontal scanning line of the horizontal scanning line decimated in the first decimating action. WRST signal 43, RE signal 47, and RRST signal 46, is set same as in the first decimating action, and the image display device 14 displays the image data 42 reduced at the reduction rate of y'/y in the vertical direction by using the vertical synchronizing signal 49 and horizontal synchronizing signal 50, same as in the first decimating action.

After the third frame, the above operations of the second frame and third frame are repeated alternately.

When the random access memory such as DRAM and VRAM is used in the memory 11, the memory control unit 12 generates a control signal of the memory 11 so as not to write the image data 41 into the memory 11 when the WE signal 44A in FIG. 7 is "L". Moreover, the memory control unit 12 generates a control signal of the memory 11 so as not to write the image data 41 into the memory 11 when the WE signal 44C in FIG. 8 is "L".

By executing the first decimating action and second decimating action alternately frame by frame, the same effect as the FIFO is obtained in the image size reducing apparatus using random access memory. In this case, being accessible randomly to the address in the memory, the memory control unit 12 writes all of image data 41 into the memory 11, and prohibits reading of image data 41 corresponding to the processing line group, out of the image data 41 stored in the memory 11, as the first decimating action, thereby controlling the memory 11 so as to read out sequentially the image data 42 except the processing line group.

Further, as the second decimating action, the memory control unit 12 prohibits reading of image data corresponding to the next horizontal scanning line of the horizontal scanning line decimated in the first decimating action, out of the image data 41 stored in the memory 11, and controls the memory 11 so as to read out sequentially the image data 42.

By executing the first decimating action and second decimating action alternately frame by frame, the same effect as the FIFO is obtained, in the image size reducing apparatus using random access memory and the image size reduced at the reduction rate y'/y in the vertical direction may be displayed in the image display device 14.

A modified example 1 of the image size reducing apparatus in embodiment 4 is explained below on the basis of the basic operation in embodiment 4, briefing only different points while referring to FIG. 7, FIG. 8 and FIG. 12.

The structure is exactly same as in FIG. 12, and different points are only determination of the region in the memory control unit 12, and the method of selection of horizontal scanning line to be processed in the first decimating action.

First, the region for selecting the line to be decimated is a frame. Therefore, without dividing the frame into groups, writing of image data of the number of processing lines determined by the reduction rate into the memory 11 is prohibited.

Then, the processing lines in the first decimating action are horizontal scanning lines corresponding to line numbers from the smaller value of the line difference value operated in the preceding frame till the number of processing lines. Therefore, the image data corresponding to this is not written into the memory 11.

That is, selecting processing line numbers corresponding to (y–y') line difference values from the smaller one of the line difference value 55 determined in the preceding frame, a WE signal 44A in FIG. 7 is generated for the image data corresponding to said processing line numbers, out of all image data composing the present frame.

Next, a modified example 2 of the image size reducing apparatus in embodiment 4 is explained below based on the basic operation in embodiment 4, briefing only different points from the basic operation while referring to FIG. 10 and FIG. 12.

The structure is exactly same as in FIG. 12, and different points are only determination of the region in the memory control unit 12, and the method of selection of horizontal scanning line to be processed in the first decimating action.

First, the region for selecting the horizontal scanning lines to be decimated is obtained by dividing one frame into Z groups of image, and the number of processing lines determined by the reduction rate is distributed into Z groups of image, and the processing line number is selected in each image group. WE signal 44A in FIG. 7 is created for the processing line of said processing number, and writing of image into the memory 11 is prohibited.

This procedure is exactly same as in modified example 2 in embodiment 3, and the explanation is omitted.

The other operation is exactly same as in the basic operation of embodiment 4.

Still more, a modified example 3 of the image size reducing apparatus in embodiment 4 is explained below based on the basic operation in embodiment 4, briefing only different points from the basic operation while referring to FIG. 11 and FIG. 12.

The structure is exactly same as in FIG. 12, and different points are only determination of the region in the memory control unit 12, and the method of selection of horizontal scanning line to be processed in the first decimating action.

First, the region for selecting the horizontal scanning lines to be decimated is obtained by dividing one frame into Z groups of image, and the image data of the number of processing lines determined by the reduction rate 51 is distributed into Z groups, the processing line number is selected in each image group, and the WE signal 44A in FIG. 7 is created for the processing line of said processing line number, and writing of image of said processing line into the memory 11 is forbidden. The grouping procedure is same as the procedure of modified example 2 of embodiment 3.

Thus, embodiment 4 of the invention has a feature, in addition to the effects of embodiment 3 that a reduced image size can be displayed also in the image display device which is required to be constant in the number of horizontal scanning lines in the frame, such as the image display device using a cathode-ray tube, because the horizontal synchronizing signals which are control signals of the image display device are not decimated.

In the foregoing embodiments 1, 2, 3 and 4 of the invention, the operation is explained using the sequential scanning picture, but the invention may be also applied to the interlace scanning picture.

For this purpose, image data of frame signals composed of two consecutive fields are stored in the memory, and serial line numbers are given in the frame unit, and the same effects are obtained by processing same as in the embodiments using said serial line number.

Further, if the image size reducing procedure is executed in the field unit, the same image size reduction as in the above image size reduction is also realized. In this case, by decimating the odd-number field among consecutive odd-number fields, and the even-number fields among consecutive even-number fields, the effects of preventing missing of fine horizontal line or vague edge in the vertical direction will not be sacrificed.

As explained herein, according to the image size reducing apparatus of the invention and the image size reducing method employed therein, the image can be reduced in the vertical direction and displayed, without requiring complicated circuit such as digital filter, while minimizing loss of horizontal line, deformation of fine character, vague edge in the vertical direction, and local deformation of image.

What is claimed is:

1. An image size reducing apparatus comprising:

a counter for counting horizontal synchronization pulses;

gate signal generating circuit for storing a plurality of horizontal scan line numbers, the horizontal scan line numbers being noncontinuous, selected ones of the plurality of horizontal scan line numbers being designated for decimation in accordance with a reduction rate of a vertical image size, the gate signal generating circuit generating a gate signal in a period corresponding to X+1 or X−1, of the plurality of horizontal scan line numbers; where X is a horizontal scan line; and a gate circuit responsive to said gate signal for decimating at least one of an enable signal and a clock signal in the time period X+1or X−1 together with a corresponding horizontal synchronization pulse, the at least one of the enable signal and clock signal defining a decimated control signal set; and an image display device driven by a vertical synchronization signal and being responsive to the decimated horizontal synchronization pulse together with the decimated control signal set.

2. The image size reducing apparatus of claim 1, wherein the horizontal scan line numbers designated for decimation define a processing line group which is not displayed as image data by the image display device.

* * * * *

UNITED STATES PATENT AND TRADEMARK OFFICE
CERTIFICATE OF CORRECTION

PATENT NO. : 6,392,701 B1
DATED : May 21, 2002
INVENTOR(S) : Akeyama et al.

It is certified that error appears in the above-identified patent and that said Letters Patent is hereby corrected as shown below:

Title page,
Item [56], References Cited, FOREIGN PATENT DOCUMENTS, "JP 7-17Q449 7/1995" should read -- JP 7-170449 7/1995 --

Signed and Sealed this

Twenty-eighth Day of January, 2003

JAMES E. ROGAN
*Director of the United States Patent and Trademark Office*